United States Patent
Yang et al.

(10) Patent No.: US 11,652,879 B2
(45) Date of Patent: May 16, 2023

(54) MATCHING METHODS, APPARATUSES, AND DEVICES BASED ON TRUSTED ASSET DATA

(71) Applicant: ALIPAY (HANGZHOU) INFORMATION TECHNOLOGY CO., LTD., Zhejiang (CN)

(72) Inventors: Renhui Yang, Hangzhou (CN); Wenyu Yang, Hangzhou (CN); Shubo Li, Hangzhou (CN); Yuan Chen, Hangzhou (CN); Qin Liu, Hangzhou (CN); Qin Xiong, Hangzhou (CN); Sheng Zhang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,602

(22) Filed: Jun. 30, 2021

(65) Prior Publication Data
US 2021/0329067 A1    Oct. 21, 2021

(30) Foreign Application Priority Data

Aug. 28, 2020   (CN) .......................... 202010889208.9

(51) Int. Cl.
    *H04L 67/1074*   (2022.01)
    *H04L 67/1061*   (2022.01)
    *H04L 67/51*     (2022.01)

(52) U.S. Cl.
    CPC ........ *H04L 67/108* (2013.01); *H04L 67/1065* (2013.01); *H04L 67/1076* (2013.01); *H04L 67/51* (2022.05)

(58) Field of Classification Search
    CPC .............. H04L 67/108; H04L 67/1065; H04L 67/1076; H04L 67/16; H04L 41/16
    (Continued)

(56) References Cited

U.S. PATENT DOCUMENTS 6,671,818 B1 * 12/2003 Mikurak ................. H04L 63/08
                                                    714/48
7,216,056 B2 *  5/2007 Kubota ................. G06F 16/958
                                                    709/224
(Continued)

FOREIGN PATENT DOCUMENTS

CN         1996955       7/2007
CN       103677935       3/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Thu Ha T Nguyen
(74) *Attorney, Agent, or Firm* — Fish & Richardson P.C.

(57) ABSTRACT

Embodiments of the present specification disclose matching methods, apparatuses, and devices based on trusted asset data. One method comprises: analyzing trusted asset data of a first entity to obtain asset description information of the first entity, wherein the trusted asset data is stored on a trusted device; obtaining service information of a plurality of second entities; determining target service information that matches the first entity based on the asset description information and the service information; and sending the target service information to the first entity.

20 Claims, 4 Drawing Sheets

(58) Field of Classification Search
USPC .................................... 709/203, 223, 224
See application file for complete search history.

(56) References Cited

U.S. PATENT DOCUMENTS

| | | | |
|---|---|---|---|
| 7,296,078 B2* | 11/2007 | Sanchez Herrero | ........................ H04L 63/0892 709/227 |
| 7,536,595 B1* | 5/2009 | Hiltunen | ............. G06F 11/0793 714/26 |
| 7,689,493 B1* | 3/2010 | Sullivan | ................. G06Q 40/06 705/36 R |
| 7,827,267 B2* | 11/2010 | Chun | ................. H04N 21/6582 709/224 |
| 8,589,269 B1* | 11/2013 | Bendel | ................... G06Q 40/06 705/35 |
| 8,903,884 B2* | 12/2014 | Vasters | ................... H04L 67/02 709/201 |
| 9,736,308 B1* | 8/2017 | Wu | ...................... H04M 3/5233 |
| 9,860,391 B1* | 1/2018 | Wu | ................... H04M 15/8061 |
| 10,319,040 B1* | 6/2019 | Ahdritz | ............. G06Q 30/0222 |
| 10,505,741 B1 | 12/2019 | Conley | |
| 10,810,290 B2* | 10/2020 | Minter | ..................... G06F 21/64 |
| 11,005,839 B1* | 5/2021 | Shahidzadeh | ......... H04W 12/06 |
| 11,233,776 B1* | 1/2022 | Muddapappu | ........ H04L 63/102 |
| 2004/0068652 A1* | 4/2004 | Carpentier | ............ H04L 63/065 713/168 |
| 2006/0047704 A1* | 3/2006 | Gopalakrishnan | ...... G06F 16/51 707/E17.031 |
| 2006/0259573 A1* | 11/2006 | Goodman | ............... H04L 67/06 709/217 |
| 2006/0293990 A1* | 12/2006 | Schaub | .................. G06Q 40/02 705/31 |
| 2008/0120129 A1* | 5/2008 | Seubert | ................ G06Q 40/125 705/305 |
| 2008/0133731 A1* | 6/2008 | Bradley | .................. H04L 67/16 709/223 |
| 2008/0140835 A1* | 6/2008 | Bradley | .............. H04L 67/1061 709/225 |
| 2008/0285757 A1* | 11/2008 | Bradley | .................. H04L 63/10 380/278 |
| 2009/0094453 A1* | 4/2009 | Bradley | .................. H04L 67/16 713/153 |
| 2010/0005509 A1* | 1/2010 | Peckover | ............ H04L 63/0281 726/3 |
| 2010/0067699 A1* | 3/2010 | Bradley | ............ G06Q 20/1235 380/277 |
| 2010/0241849 A1* | 9/2010 | Bradley | ................ G06F 16/951 713/153 |
| 2010/0250927 A1* | 9/2010 | Bradley | ................ H04L 63/20 726/26 |
| 2011/0041171 A1* | 2/2011 | Burch | ................. H04L 63/0884 709/229 |
| 2011/0173676 A1* | 7/2011 | Peckover | ................. H04L 63/08 726/3 |
| 2011/0225293 A1* | 9/2011 | Rathod | ................. G06Q 30/0269 709/224 |
| 2012/0042389 A1* | 2/2012 | Bradley | .................. H04L 63/10 726/26 |
| 2012/0159643 A1* | 6/2012 | Bradley | .................. H04L 63/20 726/27 |
| 2012/0173720 A1* | 7/2012 | Lin | ........................ G06Q 99/00 709/224 |
| 2012/0259722 A1* | 10/2012 | Mikurak | ............ G06Q 30/0261 705/26.1 |
| 2013/0085881 A1* | 4/2013 | Chary | ..................... G06Q 30/02 705/26.1 |
| 2013/0339146 A1* | 12/2013 | Goldberg | ........... G06Q 30/0212 705/14.53 |
| 2014/0066014 A1* | 3/2014 | Nicholson | ........... H04W 12/088 455/411 |
| 2014/0195380 A1* | 7/2014 | Jamtgaard | .......... G06Q 30/0601 709/224 |
| 2014/0280963 A1* | 9/2014 | Burbridge | ............. H04L 67/125 709/226 |
| 2015/0033305 A1* | 1/2015 | Shear | ...................... G06F 21/53 726/11 |
| 2015/0287059 A1* | 10/2015 | Ouyang | ........... G06Q 10/06393 705/7.31 |
| 2015/0288465 A1* | 10/2015 | Ouyang | ................. H04B 17/18 455/67.11 |
| 2016/0308855 A1* | 10/2016 | Lacey | ................... G06Q 50/265 |
| 2017/0048209 A1* | 2/2017 | Lohe | ........................ H04L 9/14 |
| 2017/0140174 A1* | 5/2017 | Lacey | ................ G06Q 20/4016 |
| 2018/0033027 A1* | 2/2018 | Ganesh | .................. G06Q 30/02 |
| 2018/0191503 A1* | 7/2018 | Alwar | ........................ H04L 9/14 |
| 2018/0234496 A1* | 8/2018 | Ratias | ...................... A63F 13/60 |
| 2018/0254898 A1 | 9/2018 | Sprague et al. | |
| 2019/0041853 A1* | 2/2019 | Jain | ....................... G05D 1/0287 |
| 2020/0067922 A1* | 2/2020 | Avetisov | ................ H04L 63/18 |
| 2020/0137021 A1* | 4/2020 | Janakiraman | ....... H04L 61/4511 |
| 2020/0145198 A1* | 5/2020 | Guan | ........................ H04L 9/30 |
| 2021/0109936 A1* | 4/2021 | Sun | ........................ G06F 16/116 |
| 2021/0176239 A1* | 6/2021 | Rose | .................... G06N 3/0454 |
| 2021/0201328 A1* | 7/2021 | Gunther | ............... G06Q 20/401 |
| 2021/0264520 A1* | 8/2021 | Cummings | ........... G06Q 20/02 |
| 2021/0272473 A1* | 9/2021 | Boskovic | ............ G06F 21/577 |
| 2021/0344485 A1* | 11/2021 | Levin | ..................... H04L 63/06 |
| 2022/0108262 A1* | 4/2022 | Cella | ................ G06Q 10/063118 |
| 2022/0343296 A1* | 10/2022 | Roberts | ................ G06Q 20/389 |

FOREIGN PATENT DOCUMENTS

| | | |
|---|---|---|
| CN | 104010044 | 8/2014 |
| CN | 105631322 | 6/2016 |
| CN | 106408486 | 2/2017 |
| CN | 107507091 | 12/2017 |
| CN | 107579979 | 1/2018 |
| CN | 107622385 | 1/2018 |
| CN | 107729745 | 2/2018 |
| CN | 107742189 | 2/2018 |
| CN | 107968709 | 4/2018 |
| CN | 108076011 | 5/2018 |
| CN | 108471350 | 8/2018 |
| CN | 108616539 | 10/2018 |
| CN | 108632284 | 10/2018 |
| CN | 108881160 | 11/2018 |
| CN | 108932297 | 12/2018 |
| CN | 108985089 | 12/2018 |
| CN | 109150607 | 1/2019 |
| CN | 109245893 | 1/2019 |
| CN | 109376504 | 2/2019 |
| CN | 109522722 | 3/2019 |
| CN | 109525400 | 3/2019 |
| CN | 109547500 | 3/2019 |
| CN | 109660358 | 4/2019 |
| CN | 109710270 | 5/2019 |
| CN | 109741039 | 5/2019 |
| CN | 109768865 | 5/2019 |
| CN | 109840436 | 6/2019 |
| CN | 109993490 | 7/2019 |
| CN | 110009232 | 7/2019 |
| CN | 110034924 | 7/2019 |
| CN | 110046165 | 7/2019 |
| CN | 110083610 | 8/2019 |
| CN | 110086804 | 8/2019 |
| CN | 110222533 | 9/2019 |
| CN | 110224837 | 9/2019 |
| CN | 110335149 | 10/2019 |
| CN | 110457875 | 11/2019 |
| CN | 110516178 | 11/2019 |
| CN | 110555292 | 12/2019 |
| CN | 110636062 | 12/2019 |
| CN | 110837658 | 2/2020 |
| CN | 110968743 | 4/2020 |
| CN | 110990804 | 4/2020 |
| CN | 111049660 | 4/2020 |
| CN | 111179067 | 5/2020 |
| CN | 111191268 | 5/2020 |
| CN | 111222157 | 6/2020 |
| CN | 111340627 | 6/2020 |

(56) References Cited

FOREIGN PATENT DOCUMENTS

| CN | 111414599 | 7/2020 |
|---|---|---|
| CN | 111415157 | 7/2020 |
| CN | 111506662 | 8/2020 |
| CN | 111597565 | 8/2020 |
| CN | 111741036 | 10/2020 |
| WO | WO 2019179535 | 5/2020 |

OTHER PUBLICATIONS

Nakamoto, "Bitcoin: A Peer-to-Peer Electronic Cash System," www.bitcoin.org, 2005, 9 pages.
U.S. Appl. No. 17/364,658, filed Jun. 30, 2021, Wenyu Yang.
U.S. Appl. No. 17/362,914, filed Jun. 29, 2021, Qin Liu.
U.S. Appl. No. 17/359,475, filed Jun. 25, 2021, Renhui Yang.
U.S. Appl. No. 17/358,249, filed Jun. 25, 2021, Shubo Li.
U.S. Appl. No. 17/359,487, filed Jun. 25, 2021, Renhui Yang.
U.S. Appl. No. 17/348,975, filed Jun. 16, 2021, Renhui Yang.
U.S. Appl. No. 17/349,764, filed Jun. 16, 2021, Qin Liu.
U.S. Appl. No. 17/359,069, filed Jun. 25, 2021, Yuan Chen.
U.S. Appl. No. 17/359,219, filed Jun. 25, 2021, Yuan Chen.
U.S. Appl. No. 17/359,476, filed Jun. 25, 2021, Wenyu Yang.

\* cited by examiner

MATCHING METHODS, APPARATUSES, AND DEVICES BASED ON TRUSTED ASSET DATA

CROSS-REFERENCE TO RELATED APPLICATIONS

This application claims priority to Chinese Patent Application No. 202010889208.9, filed on Aug. 28, 2020, which is hereby incorporated by reference in its entirety.

TECHNICAL FIELD

The present application relates to the field of computer technologies, and in particular, to matching methods, apparatuses, and devices based on trusted asset data.

BACKGROUND

With the development of information technologies and the arrival of big data era, everyone is a contributor to data, and data with transaction values that belong to individuals or enterprises can be referred to as asset data. Asset data can be digital property belonging to regular individuals or enterprises, and is a data resource that can bring future economic benefits to enterprises and organizations.

Protection of asset data is particularly important for individuals or enterprises. Under the operating background of big data, the asset data can satisfy the demands of scientific research and teaching, and can also satisfy the demands of enterprises or individuals to use data for corresponding service processing. Therefore, enterprises and enterprises, enterprises and various institutions, and enterprises/institutions and individuals can obtain asset data from each other by cooperating, performing transactions, etc. to utilize the value of data assets.

Therefore, a matching solution based on trusted asset data needs to be provided to match entities with asset data to implement supply and demand matching.

SUMMARY

Embodiments of the present specification provide matching methods, apparatuses, and devices based on trusted asset data so as to solve a problem that automatic matching cannot be implemented in the existing trusted data asset transaction.

To solve the previous technical problem, the embodiments of the present specification provide the following solutions:

Some embodiments of the present specification provide a matching method based on trusted asset data, including the following: asset description information of a first entity is obtained, the asset description information is obtained by analyzing trusted asset data of the first entity, and the trusted asset data is stored on a trusted device; service information of each second entity is obtained; target service information matched with the first entity is determined based on the asset description information and the service information of each second entity; and the target service information is sent to the first entity.

Some embodiments of the present specification provide a matching apparatus based on trusted asset data, including the following: an asset description information acquisition module, configured to obtain asset description information of a first entity, the asset description information being obtained by analyzing trusted asset data of the first entity, and the trusted asset data being stored on a trusted device; a service information acquisition module, configured to obtain service information of each second entity; a target service information matching module, configured to determine target service information matched with the first entity based on the asset description information and the service information of each second entity; and an information sending module, configured to send the target service information to the first entity.

Some embodiments of the present specification provide a matching device based on trusted asset data, including the following: at least one processor; and a memory communicably coupled to the at least one processor, where the memory stores instructions executable by the at least one processor, and the instructions are executed by the at least one processor so that the at least one processor can: obtain asset description information of a first entity, the asset description information being obtained by analyzing trusted asset data of the first entity, and the trusted asset data being stored on a trusted device; obtain service information of each second entity; determine target service information matched with the first entity based on the asset description information and the service information of each second entity; and send the target service information to the first entity.

Some embodiments of the present specification provide a computer-readable medium, where computer-readable instructions are stored on the computer-readable medium, and the computer-readable instructions can be executed by a processor to implement a matching method based on trusted asset data.

One or more embodiments of the present specification can achieve the following beneficial effects: asset description information obtained by analyzing trusted asset data of a first entity stored on a trusted device is obtained, service information of each second entity is then obtained, target service information matched with the first entity is determined based on the asset description information and the service information of each second entity, and the target service information is sent to the first entity. In a matching process, original trusted asset data is not out of domain, and an analyzed object is asset description information obtained by analyzing the trusted asset data, thereby protecting privacy of the trusted asset data. The trusted asset data is stored on a trusted device so that credibility of the asset data can be ensured. The asset description information of each entity is analyzed so that matching of service information is implemented, and service processing between the entities is matched.

BRIEF DESCRIPTION OF DRAWINGS

To describe the technical solutions in the embodiments of the present specification or in the existing technology more clearly, the following is a brief introduction of the accompanying drawings needed for describing the embodiments or the existing technology. Clearly, the accompanying drawings in the following description show merely some embodiments described in the present application, and a person of ordinary skill in the art can still derive other drawings from these accompanying drawings without making innovative efforts.

DESCRIPTION OF EMBODIMENTS

To make purposes, technical solutions and advantages of one or more embodiments of the present specification more clear, the following clearly and fully describes the technical solutions in the one or more embodiments of the present specification with reference to the embodiments of the present specification and corresponding accompanying drawings. Clearly, the described embodiments are merely some but not all of the embodiments of the present specification. Based on the embodiments of the present specification, all other embodiments derived by a person of ordinary skill in the art without making innovative efforts shall fall within the protection scope of the one or more embodiments of the present specification.

The following describes in detail the technical solutions provided in the embodiments of the present specification with reference to the accompanying drawings.

A blockchain is a technical solution for collectively maintaining a reliable database in a decentralization way and in a trustless way, the blockchain has characteristics of decentralization, distributed storage, encryption, and traceability. Because distributed accounting and storage are used, a centralized hardware or management mechanism does not exist, any node has an equal right and an equal obligation, and a data block in a system is jointly maintained by nodes with a maintenance function in the whole system. A digital currency transaction or other data can be safely stored, information cannot be forged or tampered with, and transaction confirmation on the blockchain is jointly completed by all nodes on the blockchain.

Mechanisms, such as a consensus algorithm and an encryption algorithm, of the blockchain can effectively manage data asset data, such as copyright data, contract data, and game props.

In the financial field, the asset data can be digital property belonging to a regular individual or an enterprise, and is a data resource that can bring future economic benefits to an enterprise and an organization.

Figure 1:
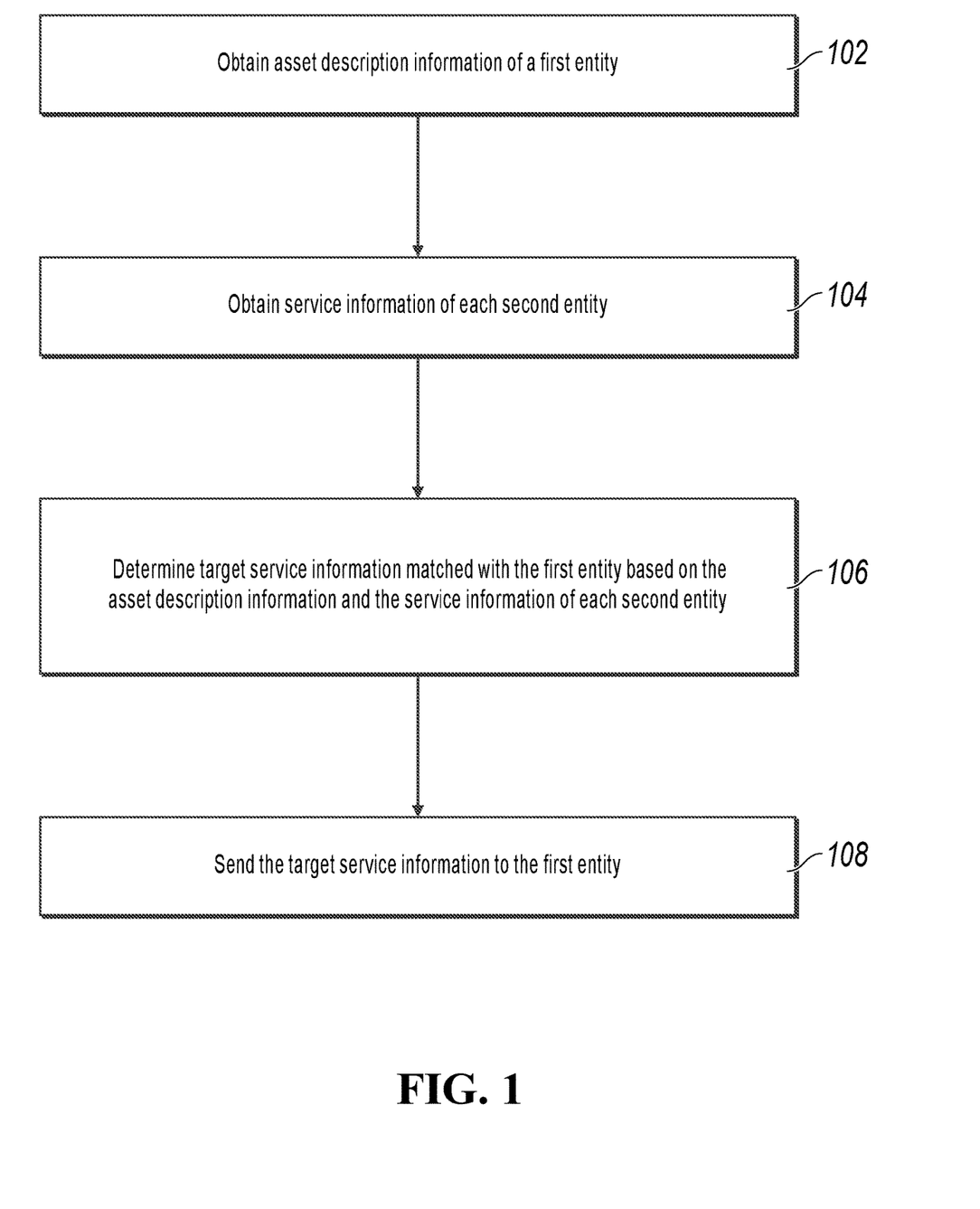
FIG. 1 is a flowchart illustrating a matching method based on trusted asset data, according to some embodiments of the present specification.

FIG. 1 is a flowchart illustrating a matching method based on trusted asset data, according to some embodiments of the present specification. From a program perspective, an execution body of a flow can be a program carried on an application server or an application client device. An execution body of the embodiments can be a blockchain network where trusted asset data for each entity is published.

As shown in FIG. 1, the flow can include the following steps:

Step 102. Asset description information of a first entity is obtained, the asset description information is obtained by analyzing trusted asset data of the first entity, and the trusted asset data is stored on a trusted device.

It is worthwhile to note that the entity in the previous step can be an individual, an enterprise, or another institution. Each entity can publish trusted asset data of the entity to the blockchain network for storage and transfer.

The asset description information can represent information for describing trusted asset data. For example, the information can be basic description information of an entity, annual asset status description information of an entity, service description information of an entity, etc. For example, asset description information of enterprise A can be "enterprise A, service scope: computer, annual net profit: 3 million."

The operation that the trusted asset data of the first entity is analyzed to obtain asset description information can specifically include the following:

calculation statistics is performed on the trusted asset data of the first entity to obtain asset description information of the first entity;

or, the trusted asset data of the first entity is analyzed based on a predetermined data dimension to obtain asset description information of the first entity. The predetermined data dimension can include: a basic attribute information dimension of an entity, an industry information dimension of an entity (for example, real estate information, enterprise information, a credit record, and statement information), a service capability dimension of an entity (for example, a service scope), an operation condition dimension, etc. The basic attribute information of the entity can be basic attribute information corresponding to an individual or basic attribute information corresponding to an enterprise or another organization. For the individual, the basic attribute information of the entity can include a name, an age, a residence, etc. of a user. For the enterprise, the basic attribute information of the entity can include registration information of the enterprise.

The trusted asset data can be digital property of a regular individual or an enterprise. For example, the trusted asset data can be various kinds of data files such as a photo and a video of an individual, an edited document, medical record data of an individual, and industry data. Or, the trusted asset data can further be a design drawing, a contract, and an order of the enterprise, and any data relating to various types of file services.

In the embodiments, the trusted asset data can be data having asset transaction value stored on a trusted device. For example, the trusted asset data can be medical record data, a photo and a video, a novel document, etc. of an individual. The trusted asset data can also be data used to assist in service handling, such as, a credit record and bank statement data of an individual. The trusted asset data can further be data such as a specific annual operating condition, asset income, and a company report of each company. Certainly, the data used to assist in service handling can also be transacted based on actual application, and implementations are not specifically limited in the present specification.

The trusted device can include blockchain networks of authorities such as banks and real estate bureaus. The trusted device can also include hardware such as a trusted USB flash disk and a trusted memory.

In the previous step, obtained data is not original asset data of each entity, but asset description information obtained by analyzing the original asset data. As such, it can be ensured that original data is not out of domain, thereby ensuring security and privacy of the original data.

Step 104. Service information of each second entity is obtained.

The second entity here can represent all entities other than the first entity.

The service information can include asset description information of the second entity, service-related information that can be provided, etc. For example, if the second entity is an enterprise, service information of the enterprise can include information such as an enterprise name, a service scope, service capability, etc. of the enterprise.

Step 106. Target service information matched with the first entity is determined based on the asset description information and the service information of each second entity.

Specifically, the operation that target service information matched with the first entity is determined based on the asset description information and the service information of each second entity can include the following:

demand information and service capability information of each entity are obtained; and the demand information and the service capability information are matched to obtain a matching result.

In the previous step, matching is performed based on a supply-demand relationship. For example, enterprise A is a financial loan service company, and enterprise B is an advertisement service company. It is determined, from demand information and service capability information of enterprise A and enterprise B, that enterprise B is not well managed, and has a reduced profit, and large liabilities, and fund injection or loan may be needed. In this case, service information of enterprise B can be sent to company A.

Step 108. The target service information is sent to the first entity.

According to the method in FIG. 1, asset description information obtained by analyzing trusted asset data of a first entity stored on a trusted device is obtained, service information of each second entity is then obtained, target service information matched with the first entity is determined based on the asset description information and the service information of each second entity, and the target service information is sent to the first entity. In a matching process, original trusted asset data is not out of domain, and an analyzed object is asset description information obtained by analyzing the trusted asset data, thereby protecting privacy of the trusted asset data. The trusted asset data is stored on a trusted device so that credibility of the asset data can be ensured. The asset description information of each entity is analyzed so that matching of service information is implemented, and service processing between the entities is matched.

Based on the method in FIG. 1, some embodiments of the present specification further provide some specific implementations of the method, which are described below.

Optionally, the operation that target service information matched with the first entity is determined based on the asset description information and the service information of each second entity can include the following:

the asset description information of the first entity is analyzed to obtain a data feature corresponding to the asset description information; and the service information of each second entity is matched based on the data feature to obtain target service information matched with the first entity.

In the previous step, data features corresponding to asset description information are obtained by analyzing the asset description information of the first entity, and the step can be performed by using various feature extraction methods. For example, feature extraction can be performed by principal components analysis (PCA) and linear discriminant analysis (LDA), or data feature extraction can be performed by using an algorithm such as a linear regression model, a logistic regression model, a decision tree model, a support vector machine (SVM) model, and a neural network. A data dimension for extraction can be determined based on actual application when the data feature extraction is performed.

For example, asset description information of enterprise A "enterprise A, annual net profit: 5.1 million, total liabilities: 3 million, service scope: advertisement" is obtained. In this case, the asset description information of enterprise A can be analyzed, feature data about enterprise A can be extracted. For example, feature extraction can be performed from a service condition dimension and a service scope dimension, and service information of other entities can be matched based on extracted features. For example, loan financial service can be matched for enterprise A, or advertisement making and propaganda services can be matched for enterprise A.

In another application, asset description information of user A can further be obtained, such as real estate information, loan information, a credit record, an expense record, and industrial information. Feature extraction can be performed on the asset description information of user A from an expense type dimension and an asset dimension, and service matching is performed for user A based on an extracted feature. For example, a consumption type of user A with the largest consumption weight obtained by analysis is real estate. In this case, real estate service information can be matched for enterprise A.

In another application, asset description information of user B can be obtained. The asset description information of user B includes medical record information of user B. In this case, feature extraction can be performed on the asset description information of user B based on a disease type and a treatment effect dimension. Service matching is performed for user B based on an extracted feature. For example, service related to each research institution can be matched for user B.

According to the previous method, feature extraction is performed on asset description information, service information of other entities is matched for an entity based on an extracted data feature, and service matching can be more targeted, thereby improving accuracy of service information matching.

Optionally, each entity publishes trusted asset data of the entity to a blockchain network, and nodes in the blockchain network analyze the trusted asset data of each entity to obtain asset description information corresponding to each entity. Certainly, each entity can also analyze trusted asset data of the entity before publishing the trusted asset data to a blockchain network, and publish the analyzed asset description information directly to the blockchain network. The specific implementations are as follows:

Method 1. Optionally, before the operation that asset description information of a first entity is obtained, the method can further include the following:

trusted asset data published by the first entity in a blockchain network is obtained; and the trusted asset data is analyzed to obtain asset description information of the first entity.

Method 2. Optionally, the operation that asset description information of a first entity can specifically include the following:

asset description information published by the first entity in a blockchain network is obtained.

Certainly, the asset description information in the previous method 2 can be obtained by analyzing the trusted asset data of each entity respectively, or the asset description information of each entity can be obtained by analyzing the trusted asset data of each entity through a special device.

A blockchain network is a brand-new distributed infrastructure and computing method that uses a blockchain-type data structure to verify and store data, uses a distributed node consensus algorithm to generate and update data, uses cryptography to ensure the security of data transmission and access, and uses a smart contract including automated script code to program and operate data. The blockchain network includes a plurality of nodes, and all nodes can receive information or a block and verify the received block when each node broadcasts the information or the block to the blockchain network. When the number of nodes approving the block verification relative to the total number of nodes in the whole blockchain network exceeds a predetermined threshold, it is determined that the blockchain network approves the block verification, and all the nodes receive the block and store the block in local node space. The node can be understood as an electronic device with a storage function, such as a server and an end-user device. The blockchain network is mainly divided into a public blockchain, a consortium blockchain, and a private blockchain.

According to the previous methods, the trusted asset data of each entity is published to the blockchain network, no institution or individual can control global data, any node stops working does not affect the overall operation of the system, and such decentralized network greatly improves the security of the trusted asset data. The non-tampering, openness, transparency, traceability, and collective maintenance of the trusted asset data are ensured.

Optionally, the asset description information can be stored in a decentralized identifiers document corresponding to the first entity.

The decentralized identifiers document can further be used to store information related to decentralized identifiers. The document can include decentralized identifiers corresponding to various devices, an identifier and a name of a database corresponding to each decentralized identifier, a key of the corresponding device, any public credentials that the identity information owner intends to disclose, a network address capable of interacting with the identity information, etc. The owner of the identity information can query or manage these decentralized identifiers documents by obtaining related private keys.

The decentralized identifiers document is stored on a blockchain, an asymmetric encryption algorithm can be used to sign, a private key is used for encryption, and a public key is needed during decryption verification.

Optionally, after the operation that target service information matched with the first entity is determined based on the asset description information and the service information of each second entity, the method can further include the following:

one or more second entities supporting the target service information are determined; and the service information of the first entity is sent to the one or more second entities supporting the target information.

When matching is performed specifically, one or more pieces of service information can be matched based on asset description information of a certain entity, and one piece of service information can be selected from a plurality of pieces of service information as target service information when the plurality of pieces of service information is matched for asset description information of an entity. A selection method can be set based on actual application. For example, service information with a highest matching degree can be determined as target service information.

In practice, one piece of service information can correspond to a plurality of entities. In this case, the target service information sent to the first entity can at least include a service type, an entity list supporting the target service, etc.

The first entity can select one or more target entities from an entity list. The blockchain network sends the service information of the first entity to the one or more target entities.

Certainly, in practice, when the blockchain network matches target service information based on the asset description information of the first entity, the matched target service information can be sent to the first entity, or the service information of the first entity can be sent to one or more entities supporting the target service information to match a service transaction between the first entity and one or more entities supporting the target service information.

Using a loan scenario as an example, target service information matched with enterprise A is determined as a loan service based on asset description information of enterprise A and service information of other entities. The entities supporting the loan service include enterprise B, enterprise C, bank D, and bank E, and target service information sent to enterprise A can at least include a service type and an entity information list supporting the target service information. In addition, service information of enterprise A can be sent to enterprise B, enterprise C, bank D, and bank E, and enterprise A can proactively send a service request to one or more entities among enterprise B, enterprise C, bank D, and bank E to apply for related service of enterprise B, enterprise C, bank D, and bank E. Enterprise B, enterprise C, bank D, and bank E can also send a service request to enterprise A to apply for service of enterprise A.

According to the previous method, the corresponding service information can be matched for each entity, and the matched service information can be sent to each entity so as to match service interaction between the entities.

In the previous method steps, each entity publishes trusted asset data to the blockchain network, nodes in the blockchain network can automatically analyze the trusted asset data of each entity to obtain asset description data, determine service information matched with each entity based on the asset description data and service information of each entity, and proactively send the corresponding service information to each entity to match service transactions between various entities. Matched service information is sent to each entity in advance based on a supply and a demand of each entity so that a reference basis is provided for a subsequent data transaction, thereby facilitating a trusted asset data transaction.

Certainly, in practice, the blockchain network can also match corresponding service information for a certain entity initiating a service request after receiving the service request of the entity, and the entity informs a service type that the entity wants to apply for when initiating the service request. Specifically, the following steps can be used for implementation:

Optionally, the method can further include the following:

a first service request sent by an end-user device of the first entity is received;

a service type requested by the first service request is determined;

target service information matched with the service type is determined from the service information of each second entity based on the service type; and the target service information is sent to the first entity, and the target service information at least includes an entity information list of each entity of the target service information.

It is worthwhile to note that the entity can indicate a service type the entity desires to request when an end-user device of a certain entity sends a service request. Target service information matched with the service type requested by the entity can be identified from service information of other entities, and the identified target service information can be sent to the end-user device where the first entity initiating the request is located.

Optionally, after the operation that the target service information is sent to the first entity, the method can further include the following:

a target entity selected by the first entity from the entity information list is determined; and the trusted asset data of the target entity is sent to the first entity.

The target service information sent to the first entity can include an entity information list, the first entity can select one or more target entities from the entity information list, and then trusted asset data of the selected target entity can be sent to the first entity.

In the previous step, an actual execution body that selects the target entity from the entity information list can be the first entity. However, the node in the blockchain network can obtain a notification indicating that an action is performed by the first entity when the first entity performs a determination action. Therefore, the present step can be understood as that the blockchain network can send the trusted asset data of the target entity selected by the first entity to the first entity after receiving a notification indicating that the target entity is selected by the first entity from the entity information list.

Taking a trusted asset data transaction as an example, institution A initiates a service request to obtain related medical record data about disease a, and identifies and determines that an entity information list with the related medical record data about disease a includes: user B, user C, institution D, and institution E, and institution A can select an entity from the entity information list institution A wants to apply for service. If institution A selects user B, trusted asset data of user B can be sent to the first entity. However, it is worthwhile to note that the trusted data asset is private data, and authorization of user B needs to be obtained before the trust asset data of user B is sent to the first entity so as to send the trust asset data of user B to other authorized entities other than user B. Therefore, the target entity also needs to verify the trusted asset data of the first entity when it is determined that the first entity selects a target entity to apply for service, and the blockchain network only sends the trusted asset data of the target entity to the first entity after the target entity approves the trusted asset data of the first entity. Specifically, the following steps can be used for implementation:

Optionally, after a target entity selected by the first entity from the entity information list is determined, the method can further include the following:

a second service request sent by the first entity is obtained;

asset description information returned by the target entity and needed to be provided by the first entity is received;

asset description information provided by the first entity is obtained; and the asset description information provided by the first entity is sent to the target entity for verification.

Optionally, after the operation that the asset description information provided by the first entity is sent to the target entity for verification, the method can further include the following:

a verifiable claim returned by the target entity is sent to the first entity after the asset description information is approved, and the verifiable claim is used to authorize the first entity to obtain the trusted asset data of the target entity.

Optionally, after the operation that the asset description information provided by the first entity is sent to the target entity for verification, the method can further include the following:

the trusted asset data of the target entity is sent to the first entity after the asset description information is approved; and the trusted asset data stored in a device of the target entity is deleted after the trusted asset data is sent to the first entity.

It is worthwhile to note that the verifiable claim can be understood as a claim of whether an identity identified by a decentralized identifier has a certain qualification. Specifically, at a data level, the verifiable claim can be data that records such a claim. In the previous steps, the verifiable claim can be a claim used to authorize other entities to obtain trusted asset data of the target entity.

In the previous steps, the service request of the first entity can be a request to obtain ownership of the trusted asset data of the target entity, or can be a request only to obtain a right to use the trusted asset data. Therefore, the target entity also needs to verify a part or all of the trusted asset data of the first entity after the first entity selects the target entity desired to apply for service. After the target entity approves a part or all of the trusted asset data of the first entity, if the service request of the first entity is to obtain a right to use the trusted asset data of the target entity, the target entity can issue a verifiable claim to the first entity, and the first entity can use the trusted asset data of the target entity with the verifiable claim. If the service request of the first entity is to obtain ownership of the trusted asset data of the target entity, the trusted asset data of the target entity is sent to the first entity after the target entity approves a part or all of the trusted asset data of the first entity, and the trusted asset data stored in the device of the target entity is deleted after the trusted asset data of the target entity is sent to the first entity, that is, the target entity can no longer store the trusted asset data after the target entity agrees to transfer the trusted asset data of the target entity to the first entity, thereby implementing transfer of the ownership of the trusted asset data.

It is worthwhile to note that, in practice, an execution body of all of the method steps in the previous embodiments can be any one or more nodes specified in the blockchain network or nodes in the blockchain network for storing trusted asset data of each entity. In addition, the execution body can further be a decentralized specific service with data matching capability outside the blockchain network, and the service can match each entity to conduct service. In practice, the following two methods can be combined for description:

Method 1. Trusted asset data matching is performed based on a service request.

Figure 2:
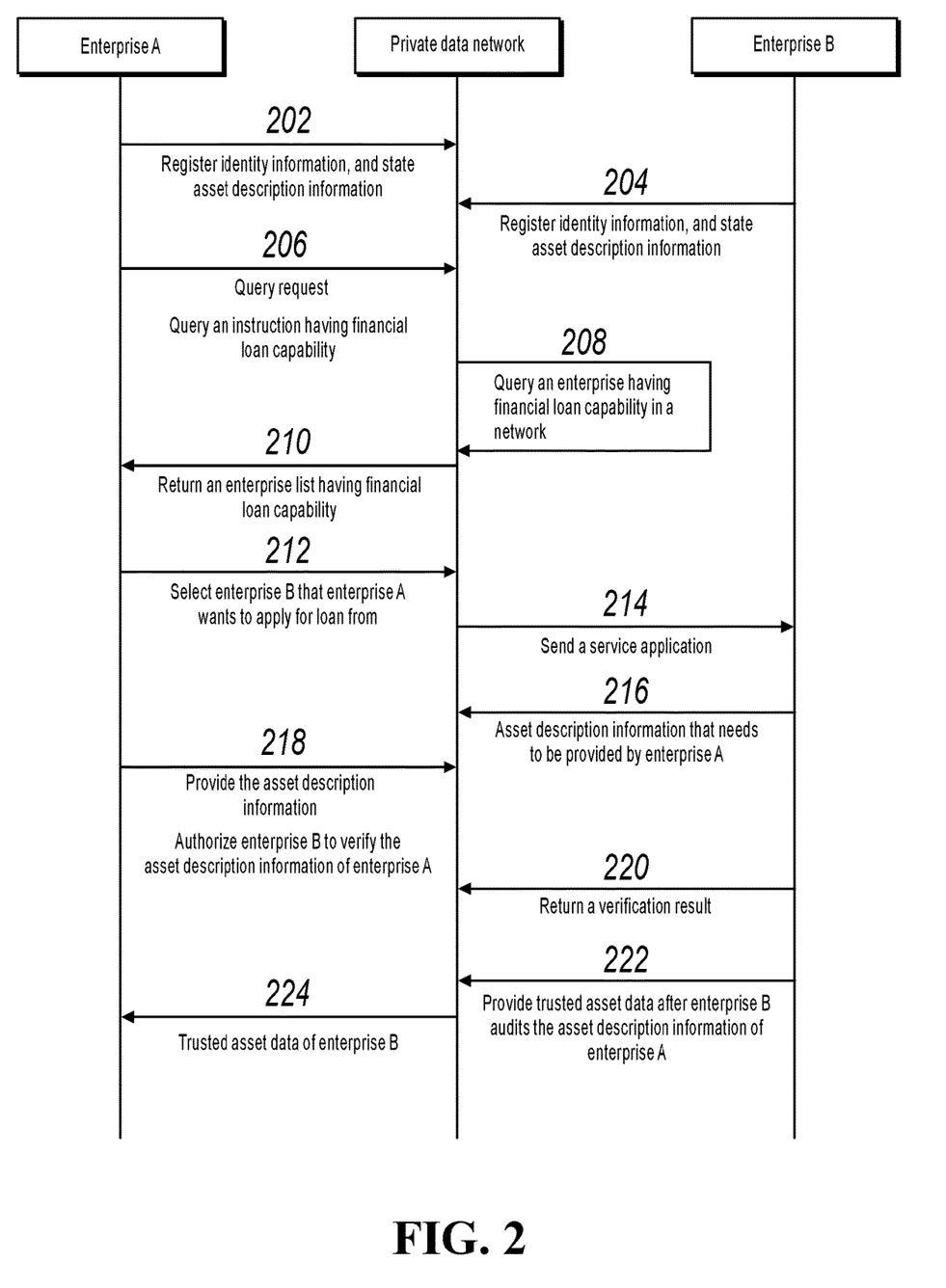
FIG. 2 is a flowchart illustrating a method for matching trusted asset data based on a service request, according to some embodiments of the present specification.

FIG. 2 is a flowchart illustrating a method for matching trusted asset data based on a service request, according to some embodiments of the present specification.

As shown in FIG. 2, financial loan is taken as an example. In the present accompany drawing, an execution body of the method can be a decentralized application with data matching capability, and can be referred to as a private data network. The private data network can match corresponding service information for an entity based on a service request of the entity. The specific steps can include the following:

Step 202. Enterprise A registers identity information in a private data network, and states asset description information corresponding to trusted asset data of enterprise A in the service (private data network).

Step 204. Enterprise B registers identity information in the private data network, and states asset description information corresponding to trusted asset data of enterprise B.

It is worthwhile to note that only description information corresponding to trusted asset data is stated in the private data service, and original trusted asset data is not published to the private data network, thereby protecting the privacy of the trusted asset data. The trusted asset data can be stored in a blockchain network and the trusted asset data can be stated in a decentralized identifiers document of a blockchain, that is, asset description information can be stored in the decentralized identifiers document.

Step 206. A query request sent by enterprise A is received, and the query request requires to query an institution having financial loan capability in a network.

Step 208. An enterprise having financial loan capability is queried based on the query request.

Step 210. An enterprise information list having financial loan capability is returned to enterprise A.

Step 212. Enterprise A selects, from the returned enterprise information list, enterprise B that enterprise A wants to apply for loan from.

Step 214. A service application is sent to enterprise B.

Step 216. Asset description information returned by enterprise B and needed to be provided by enterprise A is received.

Step 218. The asset description information provided by enterprise A is obtained, and enterprise A authorizes enterprise B to verify the asset description information of enterprise A.

Step 220. Enterprise B verifies the asset description information provided by enterprise A, and returns a verification result.

Step 222. Trusted asset data of enterprise B is obtained after enterprise B verifies the asset description information provided by enterprise A.

Step 224. The trusted asset data of enterprise B is sent to enterprise A.

According to the method steps in the previous method 1, corresponding service information can be matched for an entity based on a service request of the entity so that a service demand of the entity is satisfied, the sending accuracy of the service information is improved, and the success rate of a service transaction is improved.

Method 2. Asset description information of each entity is proactively analyzed, and matched service information is proactively sent for each entity.

Figure 3:
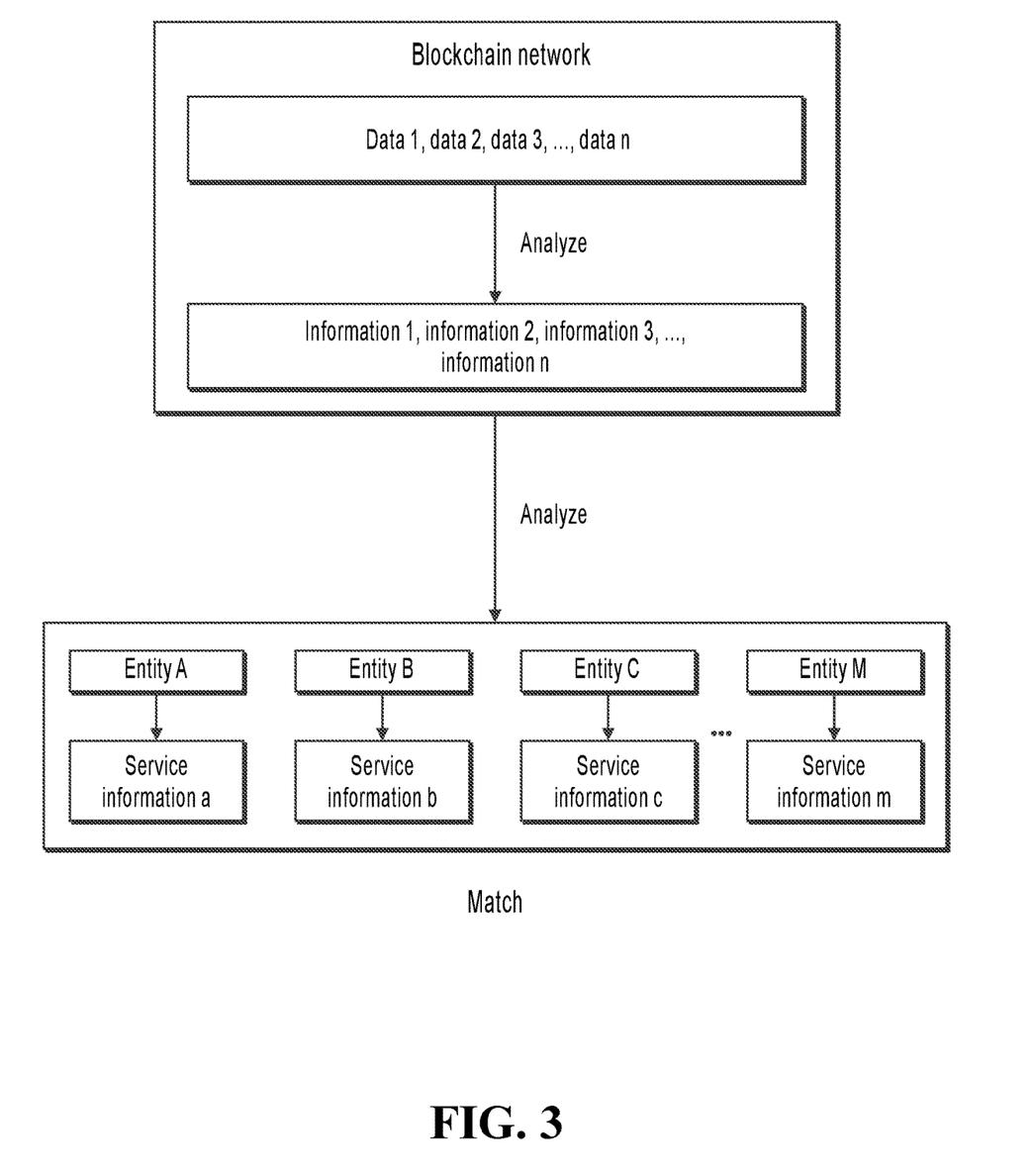
FIG. 3 is a schematic diagram illustrating proactive sending of matched information in a matching method based on trusted asset data, according to some embodiments of the present specification.

FIG. 3 is a schematic diagram illustrating proactive sending of matched information in a matching method based on trusted asset data, according to some embodiments of the present specification.

As shown in FIG. 3, each entity publishes trusted asset data in a blockchain network. For example, the blockchain network can include data 1, data 2, data 3, . . . , and data n. The blockchain network analyzes the trusted asset data of each entity to obtain asset description information corresponding to each entity, and the asset description information can include information 1, information 2, information 3, . . . , and information n. The asset description information is analyzed to obtain demand information and service capability information of each entity. Matched service information is sent to each entity based on the demand information and the service capability information corresponding to each entity. For example, a matching relationship between each entity and service information in FIG. 3 is as follows: entity A is matched with service information a, entity B is matched with service information b, entity C is matched with service information c, . . . , and entity M is matched with service information m.

The methods of the embodiments can be illustrated with the assistance of the following examples: enterprise A, enterprise B, and enterprise C all registered digital identities in the blockchain network and published their own trusted asset data in the blockchain network. The trusted asset data of enterprise A, trusted asset data of enterprise B, and trusted asset data of enterprise C are analyzed to obtain asset description information corresponding to each entity. Specifically, enterprise A is a financial loan service company, enterprise B is an advertisement service company, it is determined, from enterprise asset status information in an annual report (including basic enterprise information, enterprise asset status information, social security information, etc.), that enterprise B is not well managed, and has a reduced profit, and large liabilities, and fund injection or loan may be needed, and enterprise C is a newly established leasing company. In this case, service information of enterprise B can be sent to enterprise A, and enterprise A is prompted to apply for a loan service from enterprise B. Service information of enterprise A is sent to enterprise B, and enterprise B is prompted to proactively contact enterprise A and inquire whether a loan service is needed. Service information of enterprise B can further be sent to enterprise C, and enterprise C can be prompted to apply for an advertising service from enterprise B.

According to the method steps in the previous method 2, matched service information can be sent to each entity based on the asset description information of each entity, and possibly needed service information can be sent to each entity in advance to provide a reference basis for a subsequent service transaction, thereby facilitating a service transaction.

Figure 4:
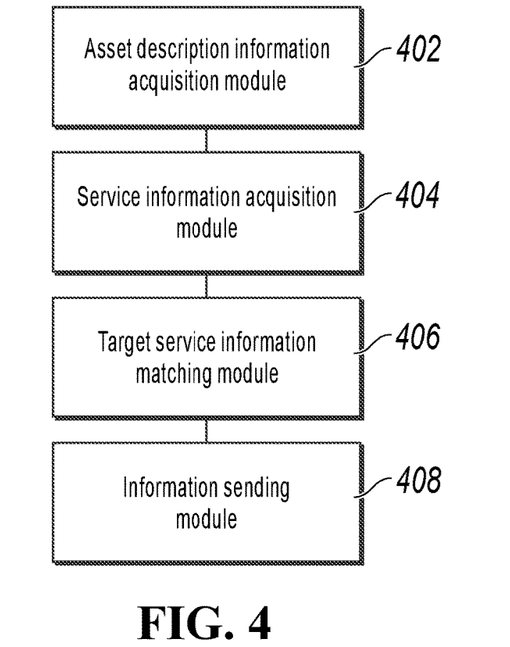
FIG. 4 is a schematic structural diagram illustrating a matching apparatus based on trusted asset data, according to some embodiments of the present specification.

Some embodiments of the present specification further provide an apparatus corresponding to the previous method based on the same idea. FIG. 4 is a schematic structural diagram illustrating a matching apparatus based on trusted asset data, according to some embodiments of the present specification. As shown in FIG. 4, the apparatus can include:

an asset description information acquisition module 402, configured to obtain asset description information of a first entity, the asset description information being obtained by analyzing trusted asset data of the first entity, and the trusted asset data being stored on a trusted device;

a service information acquisition module 404, configured to obtain service information of each second entity;

a target service information matching module 406, configured to determine target service information matched with the first entity based on the asset description information and the service information of each second entity; and an information sending module 408, configured to send the target service information to the first entity.

Based on the apparatus in FIG. 4, some embodiments of the present specification further provide some specific implementations of the method, which are described below.

Optionally, the target service information matching module 406 can specifically include:

a data feature extraction unit, configured to analyze the asset description information of the first entity to obtain a data feature corresponding to the asset description information; and a matching unit, configured to match the service information of each second entity based on the data feature to obtain target service information matched with the first entity.

Optionally, the apparatus can further include:

a trusted asset data acquisition module, configured to obtain trusted asset data published by the first entity in a blockchain network; and an analysis module, configured to analyze the trusted asset data to obtain asset description information of the first entity.

Optionally, the apparatus can further include:

a second entity determination module, configured to determine one or more second entities supporting the target service information; and a service information sending module, configured to send the service information of the first entity to the one or more second entities supporting the target information.

Optionally, the apparatus can be further configured to:

receive a first service request sent by an end-user device of the first entity;

determine a service type requested by the first service request;

determine target service information matched with the service type from the service information of each second entity based on the service type; and send the target service information to the first entity, the target service information at least including an entity information list of each entity of the target service information.

Optionally, the apparatus can further include:

a target entity selection module, configured to determine a target entity selected by the first entity from the entity information list; and a sending module, configured to send the trusted asset data of the target entity to the first entity.

Optionally, the apparatus can further include:

a second service request acquisition module, configured to obtain a second service request sent by the first entity;

an asset description information determination module, configured to receive asset description information returned by the target entity and needed to be provided by the first entity;

an asset description information receiving module, configured to obtain asset description information provided by the first entity; and a verification module, configured to send the asset description information provided by the first entity to the target entity for verification.

Optionally, the apparatus can further include:

a verifiable claim sending module, configured to send a verifiable claim returned by the target entity to the first entity after the asset description information is approved, the verifiable claim being used to authorize the first entity to obtain the trusted asset data of the target entity.

Optionally, the apparatus can further include:

a trusted asset data sending module, configured to send the trusted asset data of the target entity to the first entity after the asset description information is approved; and a trusted asset data deletion module, configured to delete the trusted asset data stored in a device of the target entity after the trusted asset data is sent to the first entity.

Optionally, the asset description information acquisition module 402 can be specifically configured to:

obtain asset description information published by the first entity in a blockchain network.

Optionally, the asset description information can be stored in a decentralized identifiers document corresponding to the first entity.

Some embodiments of the present specification further provide a device corresponding to the previous method based on the same idea.

Figure 5:
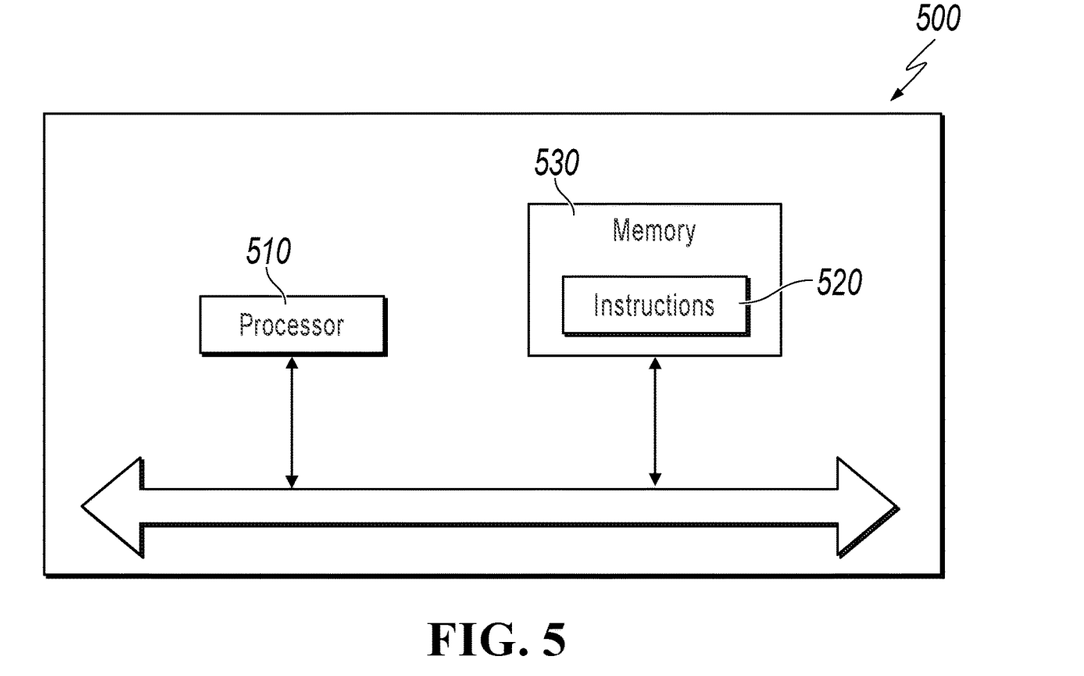
FIG. 5 is a schematic structural diagram illustrating a matching device based on trusted asset data, according to some embodiments of the present specification.

FIG. 5 is a schematic structural diagram illustrating a matching device based on trusted asset data, according to some embodiments of the present specification. As shown in FIG. 5, a device 500 can include:

at least one processor 510; and a memory 530 communicably coupled to the at least one processor, where the memory 530 stores instructions 520 executable by the at least one processor 510, and the instructions are executed by the at least one processor 510 so that the at least one processor 510 can:

obtain asset description information of a first entity, the asset description information being obtained by analyzing trusted asset data of the first entity, and the trusted asset data being stored on a trusted device;

obtain service information of each second entity;

determine target service information matched with the first entity based on the asset description information and the service information of each second entity; and send the target service information to the first entity.

Some embodiments of the present specification further provide a computer-readable medium corresponding to the previous method based on the same idea. Computer-readable instructions are stored on the computer-readable medium, and the computer-readable instructions can be executed by a processor to implement the following method:

obtaining asset description information of a first entity, the asset description information being obtained by analyzing trusted asset data of the first entity, and the trusted asset data being stored on a trusted device;

obtaining service information of each second entity;

determining target service information matched with the first entity based on the asset description information and the service information of each second entity; and sending the target service information to the first entity.

In the 1990s, whether technology improvement is hardware improvement (for example, improvement of a circuit structure, such as a diode, a transistor, or a switch) or software improvement (improvement of a method procedure) can be clearly distinguished. However, with the development of technologies, current improvement for many method procedures can be considered as direct improvement of hardware circuit structures. A designer usually programs an improved method procedure to a hardware circuit to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. Moreover, at present, instead of manually manufacturing an integrated circuit chip, such programming is mostly implemented by using "logic compiler" software. The programming is similar to a software compiler used to develop and write a program. Original code needs to be written in a particular programming language for compilation. The language is referred to as a hardware description language (HDL). There are many HDLs, such as an advanced boolean expression language (ABEL), an Altera hardware description language (AHDL), Confluence, a Cornell university programming language (CUPL), HDCal, a Java hardware description language (JHDL), Lava, Lola, MyHDL, PALASM, and a Ruby hardware description language (RHDL). A very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented in any suitable way. For example, the controller can take the form of, for example, a micro processor or processor and a computer-readable medium storing computer-readable program code (e.g., software or firmware) executable by the (micro) processor, a logic gate, a switch, an application-specific integrated circuit (ASIC), a programmable logic controller, and an embedded micro controller. Examples of the controller include, but are not limited to, the following micro controllers: ARC 625D, Atmel AT91SAM, Microchip PIC18F26K20, and Silicone Labs C8051F320. The memory controller can also be implemented as a part of the control logic of the memory. A person skilled in the art also understands that, in addition to implementing a controller by using computer-readable program code, the method steps can be logically programmed so that the controller implements the same functions in the form of a logic gate, a switch, an ASIC, a programmable logic controller, an embedded microcontroller, etc. Therefore, the controller can be regarded as a hardware component, and an apparatus included in the controller for implementing various functions can also be regarded as the structure within the hardware component. Or even, the apparatus for implementing various functions can be regarded as a software module implementing the method and a structure within the hardware component.

The system, apparatus, module, or unit illustrated in the previous embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an email receiving and transmitting device, a game console, a tablet computer, a wearable device, or any combination of these devices.

For ease of description, the previous apparatus is divided into various units based on functions for separate description. Certainly, during implementation of the present application, the functions of the units can be implemented in the same or more pieces of software and/or hardware.

A person skilled in the art should understand that the embodiments of the present invention can be provided as methods, systems, or computer program products. Therefore, the present invention can take a form of hardware embodiments, software embodiments, or embodiments combining software and hardware. Moreover, the present invention can take a form of a computer program product implemented on one or more computer available storage media (including, but not limited to, a disk memory, a CD-ROM, an optical memory, etc.) including computer-available program code.

The present invention is described with reference to flowcharts and/or block diagrams of the method, the device (system), and the computer program product according to the embodiments of the present invention. It should be understood that each flow and/or block in the flowcharts and/or block diagrams and a combination of flows and/or blocks in the flowcharts and/or block diagrams can be implemented by using computer program instructions. These computer program instructions can be provided to a processor of a general-purpose computer, a special-purpose computer, an embedded processor, or another programmable data processing device to produce a machine, so that the instructions executed by the processor of the computer or another programmable data processing device produce a device for implementing functions specified in one or more flows in the flowcharts and/or one or more blocks in the block diagrams.

These computer program instructions can also be stored in a computer-readable memory that can direct a computer or another programmable data processing device to work in a specific way, such that instructions stored in the computer-readable memory produce a product including an instruction apparatus that implements functions specified in one or more flows in the flowcharts and/or one or more blocks in the block diagrams.

These computer program instructions can also be loaded onto a computer or another programmable data processing device, such that a series of operating steps are performed on the computer or the another programmable data processing device to produce a computer-implemented process. Therefore instructions executed on the computer or the another programmable data processing device provide steps for implementing functions specified in one or more flows in the flowcharts and/or one or more blocks in the block diagrams.

In a typical configuration, the computer includes one or more processors (CPUs), an input/output interface, a network interface, and a memory.

The memory may include at least one form of a non-persistent memory, a random access memory (RAM), or a non-volatile memory in a computer-readable medium, such as a read-only memory (ROM) or a flash RAM. The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase change random access memory (PRAM), a static RAM (SRAM), a dynamic RAM (DRAM), a RAM of another type, a ROM, an electrically erasable programmable ROM (EEPROM), a flash memory or another memory technology, a CD-ROM, a digital versatile disc (DVD), or another optical storage, a cassette, a magnetic disk storage, or another magnetic storage device or any other non-transmission medium. The computer storage medium can be configured to store information that can be accessed by a computing device. As described in the present application, the computer-readable medium does not include computer-readable transitory media such as a modulated data signal and a carrier.

It is also worthwhile to note that the terms "include", "comprise" or any other variants thereof are intended to cover non-exclusive inclusion, so that a process, a method, a product, or a device that includes a series of elements includes not only those elements but also other elements that are not explicitly listed, or elements inherent in such process, method, product, or device. An element preceded by "includes a . . . " does not, without more constraints, preclude the presence of additional identical elements in the process, method, product, or device that includes the element.

A person skilled in the art should understand that the embodiments of the present application can be provided as methods, systems, or computer program products. Therefore, the present application can use a form of hardware only embodiments, software only embodiments, or embodiments with a combination of software and hardware. Moreover, the present application can use a form of a computer program product implemented on one or more computer available storage media (including, but not limited to, a disk memory, a CD-ROM, an optical memory, etc.) including computer available program code.

The present application can be described in common contexts of computer-executable instructions executed by a computer, such as a program module. Generally, the program modules include a routine, program, object, component, data structure, etc. for executing a particular task or implementing a particular abstract data type. Alternatively, the present application can be practiced in distributed computing environments. In these distributed computing environments, tasks are executed by remote processing devices that are connected by using a communications network. In the distributed computing environments, the program modules can be located in both local and remote computer storage media including storage devices.

The previous descriptions are merely embodiments of the present application, and are not intended to limit the present application. For a person skilled in the art, the present application can be subject to various modifications and variations. Any modifications, equivalent replacements, improvements, etc. that are made within the spirit and principles of the present application shall all be included within the scope of the claims of the present application.

What is claimed is:

1. A computer-implemented method, comprising:
analyzing, by a node of a blockchain network, trusted asset data of a first entity to obtain asset description information of the first entity, wherein the trusted asset data is stored on the blockchain network, wherein the first entity is an enterprise;
obtaining, by the node of the blockchain network, service information of available services provided by a plurality of second entities;
extracting, by the node of the blockchain network and by parsing the asset description information of the first entity using machine learning, a data feature of the first entity corresponding to the asset description information, wherein the data feature of the first entity comprises a service condition of the enterprise and a service scope of the enterprise;
determining, by the node of the blockchain network and based on the service information and the data feature of the first entity, target service information that matches the data feature of the first entity; and
sending, by the node of the blockchain network, the target service information to the first entity.

2. The computer-implemented method according to claim 1, wherein the trusted asset data is published by the first entity to the blockchain network.

3. The computer-implemented method according to claim 1, wherein the asset description information is published by the node of the blockchain network to the blockchain network.

4. The computer-implemented method according to claim 3, wherein the asset description information is stored in a decentralized digital identity document corresponding to the first entity.

5. The computer-implemented method according to claim 1, further comprising:
after determining the target service information that matches the data feature of the first entity, determining one or more of the plurality of second entities that support the target service information; and
sending the target service information of the first entity to the one or more of the plurality of second entities.

6. The computer-implemented method according to claim 1, further comprising:
receiving a first service request sent by an end-user device of the first entity;
determining a service type requested by the first service request;
determining the target service information that matches the service type based on the service information; and
sending the target service information to the first entity, wherein the target service information comprises an entity information list of entities associated with the target service information.

7. The computer-implemented method according to claim 6, further comprising:
after sending the target service information to the first entity, determining, from the entity information list of entities and selected by the first entity, a target entity; and
sending the trusted asset data of the target entity to the first entity.

8. The computer-implemented method according to claim 7, further comprising:
after determining the target entity, receiving a second service request sent by the first entity;
obtaining the asset description information provided by the first entity; and
sending the asset description information provided by the first entity to the target entity for verification.

9. The computer-implemented method according to claim 8, further comprising:
receiving a verifiable claim after the asset description information is verified by the target entity; and
sending the verifiable claim to the first entity, wherein the verifiable claim authorizes the first entity to obtain the trusted asset data of the target entity.

10. The computer-implemented method according to claim 8, further comprising:
sending the trusted asset data of the target entity to the first entity after the asset description information is verified; and
deleting the trusted asset data from the blockchain network after determining the service type includes obtaining data ownership of the trusted asset data.

11. A non-transitory, computer-readable medium storing one or more instructions executable by a computer system to perform operations comprising:
analyzing, by a node of a blockchain network, trusted asset data of a first entity to obtain asset description information of the first entity, wherein the trusted asset data is stored on the blockchain network, wherein the first entity is an enterprise;
obtaining, by the node of the blockchain network, service information of available services provided by a plurality of second entities;

extracting, by the node of the blockchain network and by parsing the asset description information of the first entity using machine learning, a data feature of the first entity corresponding to the asset description information, wherein the data feature of the first entity comprises a service condition of the enterprise and a service scope of the enterprise;

determining, by the node of the blockchain network and based on the service information and the data feature of the first entity, target service information that matches the data feature of the first entity; and sending, by the node of the blockchain network, the target service information to the first entity.

12. The non-transitory, computer-readable medium according to claim 11, wherein the trusted asset data is published by the first entity to the blockchain network.

13. The non-transitory, computer-readable medium according to claim 11, wherein the asset description information is published by the node of the blockchain network to the blockchain network.

14. The non-transitory, computer-readable medium according to claim 13, wherein the asset description information is stored in a decentralized digital identity document corresponding to the first entity.

15. The non-transitory, computer-readable medium according to claim 11, the operations further comprise:

after determining the target service information that matches the data feature of the first entity, determining one or more of the plurality of second entities that support the target service information; and sending the target service information of the first entity to the one or more of the plurality of second entities.

16. The non-transitory, computer-readable medium according to claim 11, the operations further comprise:

receiving a first service request sent by an end-user device of the first entity;

determining a service type requested by the first service request;

determining the target service information that matches the service type based on the service information; and sending the target service information to the first entity, wherein the target service information comprises an entity information list of entities associated with the target service information.

17. The non-transitory, computer-readable medium according to claim 16, the operations further comprise:

after sending the target service information to the first entity, determining, from the entity information list of entities and selected by the first entity, a target entity; and sending the trusted asset data of the target entity to the first entity.

18. The non-transitory, computer-readable medium according to claim 17, the operations further comprise:

after determining the target entity, receiving a second service request sent by the first entity;

obtaining the asset description information provided by the first entity; and sending the asset description information provided by the first entity to the target entity for verification.

19. The non-transitory, computer-readable medium according to claim 18, the operations further comprise:

receiving a verifiable claim after the asset description information is verified by the target entity; and sending the verifiable claim to the first entity, wherein the verifiable claim authorizes the first entity to obtain the trusted asset data of the target entity.

20. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

analyzing, by a node of a blockchain network, trusted asset data of a first entity to obtain asset description information of the first entity, wherein the trusted asset data is stored on the blockchain network, wherein the first entity is an enterprise;

obtaining, by the node of the blockchain network, service information of available services provided by a plurality of second entities;

extracting, by the node of the blockchain network and by parsing the asset description information of the first entity using machine learning, a data feature of the first entity corresponding to the asset description information, wherein the data feature of the first entity comprises a service condition of the enterprise and a service scope of the enterprise;

determining, by the node of the blockchain network and based on the service information and the data feature of the first entity, target service information that matches the data feature of the first entity; and sending, by the node of the blockchain network, the target service information to the first entity.

* * * * *